United States Patent
Keturakis

(10) Patent No.: US 10,502,109 B2
(45) Date of Patent: Dec. 10, 2019

(54) AMMONIA GENERATION FROM ENGINE EXHAUST AT AMBIENT CONDITIONS USING WATER-GAS SHIFT AND AMMONIA SYNTHESIS CATALYSTS

(71) Applicant: Cummins Emission Solutions Inc., Columbus, IN (US)

(72) Inventor: Christopher John Keturakis, Madison, WI (US)

(73) Assignee: Cummins Emission Solutions Inc., Columbus, IN (US)

( * ) Notice: Subject to any disclaimer, the term of this patent is extended or adjusted under 35 U.S.C. 154(b) by 116 days.

(21) Appl. No.: 15/677,873

(22) Filed: Aug. 15, 2017

(65) Prior Publication Data

US 2019/0055868 A1 Feb. 21, 2019

(51) Int. Cl.
*F01N 3/08* (2006.01)
*F01N 3/035* (2006.01)
(Continued)

(52) U.S. Cl.
CPC ........... *F01N 3/0842* (2013.01); *B01D 53/90* (2013.01); *B01D 53/9431* (2013.01);
(Continued)

(58) Field of Classification Search
CPC .. F01N 3/0814; F01N 3/0842; F01N 13/0097; F01N 2240/25; F01N 2510/06;
(Continued)

(56) References Cited

U.S. PATENT DOCUMENTS 8,186,149 B2 5/2012 Satoh et al.
8,899,016 B2 12/2014 Gingrich et al.
(Continued)

FOREIGN PATENT DOCUMENTS

WO WO 2016/124886 8/2016

OTHER PUBLICATIONS

Elliott et al., "Decomposition of Exhaust Gases from Diesel, Gasoline and Propane Powered Motor Coaches," Journal of the Air Pollution Control Association, vol. 5, No. 2, Aug. 1955, published online on Mar. 19, 2012.
(Continued)

*Primary Examiner* — Audrey K Bradley
*Assistant Examiner* — Anthony Ayala Delgado
(74) *Attorney, Agent, or Firm* — Foley & Lardner LLP

(57) ABSTRACT

Systems and methods described herein relate to generating ammonia from engine exhaust instead of or in addition to using on-board storage tank(s) and/or doser(s) to provide the necessary chemical reagents for purification of the exhaust stream. Systems and methods for generating ammonia and/or hydrogen from engine exhaust in exhaust aftertreatment systems under ambient conditions comprise at least one water-gas shift (WGS) catalyst and at least one ammonia synthesis catalyst (AMS catalyst) positioned downstream of the WGS catalyst. The WGS catalyst is configured, using the engine exhaust gas as an input, to generate hydrogen used by the AMS catalyst as inputs to generate ammonia and/or hydrogen. The ammonia and/or hydrogen thus generated are used downstream in ammonia- and/or hydrogen-based selective catalytic reduction catalysts (SCR).

20 Claims, 3 Drawing Sheets

(51) Int. Cl.

| | | |
|---|---|---|
| *F01N 3/10* | (2006.01) | |
| *F01N 3/20* | (2006.01) | |
| *B01D 53/90* | (2006.01) | |
| *B01D 53/94* | (2006.01) | |
| *F01N 3/021* | (2006.01) | |
| *F01N 13/00* | (2010.01) | |

(52) U.S. Cl.
CPC ......... *B01D 53/9495* (2013.01); *F01N 3/021* (2013.01); *F01N 3/035* (2013.01); *F01N 3/0878* (2013.01); *F01N 3/106* (2013.01); *F01N 3/108* (2013.01); *F01N 3/2073* (2013.01); *F01N 13/009* (2014.06); *B01D 53/9418* (2013.01); *F01N 2240/25* (2013.01); *F01N 2410/00* (2013.01); *F01N 2430/04* (2013.01); *F01N 2610/02* (2013.01); *F01N 2610/04* (2013.01)

(58) Field of Classification Search
CPC ........ F01N 3/035; F01N 3/0821; F01N 3/108; F01N 13/009; F01N 13/0093; F01N 2240/28; F01N 2240/30; F01N 2610/03; F01N 2610/04; F01N 2610/08; F01N 3/0226; F01N 3/0231; F01N 3/0835; F01N 3/206; F01N 3/2066; Y02T 10/24; Y02T 10/22; C01B 2203/0261; C01B 2203/0283; C01B 2203/042; C01B 2203/044; C01B 2203/068; C01B 3/48
See application file for complete search history.

(56) References Cited

U.S. PATENT DOCUMENTS

| | | |
|---|---|---|
| 2006/0201139 A1 | 9/2006 | Khadiya |
| 2007/0012032 A1 | 1/2007 | Hu |
| 2015/0298061 A1 | 10/2015 | Irisawa |
| 2017/0072365 A1* | 3/2017 | Lee ................ F01N 3/0842 |

OTHER PUBLICATIONS

International Search Report and Written Opinion issued for PCT application No. PCT/US2018/045716, dated Oct. 16, 2018, 14 pages.

Inoue, Y., Kitano, M., Kishida, K., Abe, H., Niwa, Y., Sasase, M., Fujita, Y., Ishikawa, H., Yokoyama, T., Hara, M., and Hosono, H., "Efficient and Stable Ammonia Synthesis by Self-Organized Flat Ru Nanoparticles on Calcium Amide," ACS Catal. 6(11):7577-7584, 2016, doi:10.1021/acscatal.6b01940.

Keturakis, C.J., Zhu, M., Gibson, E.K., Daturi, M., Tao, F., Frenkel, A.I., and Wachs, I.E., "Dynamics of $CrO_3$—$Fe_2O_3$ Catalysts during the High-Temperature Water-Gas Shift Reaction: Molecular Structures and Reactivity," ACS Catal. 4786-4798, 2016, doi:10.1021/acscatal.6b01281.

Kojima, R. and Aika, K., "Rhenium containing binary catalysts for ammonia synthesis," Appl. Catal. Gen. 209 (2001) 317-325.

Kojima, R., Enomoto, H., Muhler, M., and Aika, K., "Cesium-promoted rehnium catalysts supported on alumina for ammonia synthesis," Appl. Catal. Gen. 246(2):311-322, 2003, doi:10.1016/S0926-860X(03)00062-0.

Kuchaev, V.L., Shapatina, E.N., and Avetisov, A.K., "Mechanism of Oxygen Poisoning of Ammonia Synthesis Catalyst," Russ. J. Electrochem. 45(9):983-995, 2009, doi:10.1134/S1023193509090031.

Lan, R., Irvine, J.T.S., and Tao, S., "Synthesis of ammonia directly from air and water at ambient temperature and pressure," Sci. Rep. 3, Jan. 2013, doi:10.1038/srep01145.

Liu, H., "Ammonia synthesis catalyst 100 years: Practice, enlightenment and challenge," Chin. J. Catal. 35(10):1619-1640, Oct. 2014, doi:10.1016/S1872-2067(14)60118-2.

Newsome, D.S., "The Water-gas Shift Reaction," Catal Rev-Sci Eng 21:275-318, 1980.

Ratnasamy, C. and Wagner, J.P., "Water Gas Shift Catalysis," Catal. Rev. 51:325-440, 2009.

Szmigiel, D., Bielawa, H., Kurtz, M., Hinrichsen, O., Mugler, M., Raróg, W., Jodzis, S., Kowalczyk, Z., Znak, L., and Zielinski, J., "The Kinetics of Ammonia Synthesis over Ruthenium-Based Catalysts: The Role of Barium and Cesium," J. Catal. 205(1):205-212, 2002, doi:10.1006/jcat.2001.3431.

Vojvodic, A., Medford, A.J., Studt, F., Abild-Pedersen, F., Khan, T.S., Bligaard, T., and Nørskov, J.K., "Exploring the limits: A low-pressure, low-temperature Haber-Bosch process," Chem. Phys. Lett. 598:108-112, 2014, http//dx/doi.org/10.1016/j.cplett.2014.03.003.

Zhu, M. and Wachs, I.E., "Iron-Based Catalysts for High-Temperature Water-Gas Shift (HT-WGS) Reaction: A Review," ACS Catal. 6:722-732, 2016.

* cited by examiner

AMMONIA GENERATION FROM ENGINE EXHAUST AT AMBIENT CONDITIONS USING WATER-GAS SHIFT AND AMMONIA SYNTHESIS CATALYSTS

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, a selective catalytic reduction (SCR) process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia, aqueous ammonia, or urea, may be introduced into the exhaust gas flow prior to the catalyst chamber. In conventional implementations, ammonia is produced from reductant solutions stored on board of the vehicle. To introduce the reductant into the exhaust gas flow for the SCR process, an SCR system may dose or otherwise introduce the reductant through a dosing module (doser) that vaporizes or sprays the reductant into an exhaust pipe of the exhaust system upstream of the catalyst chamber. Conventional reductant dosing processes may suffer from aftertreatment system corrosion, solution condensation at low temperatures (which hinders catalyst performance), a need for a reductant tank that must be refilled when emptied, and precise dosing control via, for example, spray nozzles which are complex and expensive to manufacture.

The ammonia synthesis reaction uses nitrogen and hydrogen to make ammonia ($3H_2+N_2 \rightleftharpoons 2NH_3$), typically at high pressures (50-200 atmospheres). Conventionally, systems for providing on-board ammonia synthesis include $H_2/N_2$ tanks or fuel reforming as the source of $H_2$. Furthermore a high pressure ammonia synthesis loop is often used, similarly to that which is used in industrial processes. The complexity of conventional on-board ammonia synthesis systems requires significant effort and space to execute and is the largest limitation hindering commercial adoption.

A water-gas shift (WGS) catalyst uses water and carbon monoxide to produce hydrogen and carbon dioxide ($H_2O+CO \rightleftharpoons CO_2+H_2$). WGS catalysts come in many varieties, depending upon their application conditions. Low- and high-temperature shift (LTS and HTS) catalysts are the most commonly used varieties and are typically operated at temperatures of 180-275° C. (LTS) and 300-450° C. (HTS). Other varieties include a medium-temperature shift (MTS) WGS catalyst for a temperature range of 190-330° C. and a sour-gas shift catalyst for use with sulfur-containing gases. WGS catalysts can also perform across a wide pressure range as low as 1/10th of an atmosphere to 30 atmospheres of pressure.

SUMMARY

Implementations described herein relate to systems and methods for ammonia generation from engine exhaust at ambient conditions using water-gas shift and ammonia synthesis catalysts. One embodiment relates to a method for treating exhaust gas in an aftertreatment system. The method comprises receiving a quantity of exhaust gas from an engine. The quantity of exhaust gas contains a quantity of water, a quantity of nitrogen, and a quantity of carbon monoxide. A quantity of hydrogen is generated from the quantity of water and the quantity of carbon monoxide using a water-gas shift catalyst. Using an ammonia synthesis catalyst, a quantity of ammonia is generated using the quantity of hydrogen generated by the water-gas shift catalyst from the quantity of exhaust gas and the quantity of nitrogen from the quantity of exhaust gas, as an input. An insertion conduit feeds the quantity of ammonia, generated by the ammonia synthesis catalyst from the quantity of hydrogen generated by the water-gas shift catalyst, and the quantity of nitrogen from the quantity of exhaust gas to a selective catalytic reduction catalyst.

In some embodiments, a water conversion ratio of the water-gas shift catalyst is not greater than 25%. The quantity of nitrogen gas from the quantity of exhaust gas may flow through the water-gas shift catalyst, and the method may further comprise feeding the quantity of nitrogen gas to the ammonia synthesis catalyst and generating at least the quantity of ammonia at a nitrogen gas conversion ratio of not greater than 15%.

In some embodiments, the quantity of exhaust gas received from the engine is a portion of a total quantity of exhaust gas generated by the engine over a time period, and the method further comprises routing the quantity of exhaust gas, by the exhaust conduit, to the water-gas shift catalyst to generate the quantity of hydrogen gas. An exhaust re-combination conduit introduces the quantity of ammonia to the selective catalytic reduction catalyst by combining the quantity of ammonia with the total quantity of exhaust gas generated by the engine.

In some embodiments, the selective catalytic reduction catalyst is hydrogen-based. A hydrogen gas conduit captures a quantity of excess hydrogen gas that remains unreacted by the ammonia synthesis catalyst when producing the quantity of ammonia. The hydrogen gas conduit introduces the quantity of excess hydrogen gas to the selective catalytic reduction catalyst. The quantity of excess hydrogen gas is not greater than 1% in relation to a volume of product generated by the ammonia synthesis catalyst.

According to various embodiments, the quantity of ammonia generated by the ammonia synthesis catalyst from the quantity of hydrogen generated by the water-gas shift catalyst is not greater than 2.5% in relation to a volume of product generated by the ammonia synthesis catalyst. The quantity of hydrogen generated by the water-gas shift catalyst is not greater than 5% in relation to a volume of product generated by the water-gas shift catalyst. The quantity of water in relation to the quantity of exhaust gas is not greater than 20%. The quantity of carbon monoxide in relation to the quantity of exhaust gas is not greater than 3%.

In some embodiments, the water-gas shift catalyst is a high temperature-shift catalyst. The method further comprises operating the water-gas shift catalyst at a temperature between 200 to 550 degrees Celsius. In some embodiments, the water-gas shift catalyst is a low temperature-shift catalyst, and the method further comprises operating the water-gas shift catalyst at a temperature between 100 to 300 degrees Celsius. In some embodiments, the ammonia synthesis catalyst is operated at a temperature between 100 and 550 degrees Celsius and under atmospheric pressure between 0.5 and 3 atm.

The method may further comprise initially operating the ammonia synthesis catalyst at a temperature between 100 and 550 degrees Celsius and under atmospheric pressure between 0.5 and 3 atm and progressively increasing the pressure while the ammonia synthesis catalyst is in operation such that the ammonia synthesis catalyst continues to generate at least the quantity of ammonia using the quantity of hydrogen, generated by the water-gas shift catalyst from the quantity of exhaust gas, and a quantity of nitrogen from the quantity of exhaust gas, as an input. The temperature of the ammonia synthesis catalyst may be progressively reduced towards 20 degrees Celsius.

Another embodiment relates to an exhaust aftertreatment system. The exhaust aftertreatment system comprises an exhaust conduit structured to receive a quantity of exhaust gas from an engine. The quantity of exhaust gas contains a quantity of water, a quantity of nitrogen, and a quantity of carbon monoxide. The exhaust aftertreatment system further comprises a water-gas shift catalyst structured to generate at least a quantity of hydrogen from the quantity of water and the quantity of carbon monoxide, an ammonia synthesis catalyst structured to generate at least a quantity of ammonia using the quantity of hydrogen generated by the water-gas shift catalyst and the quantity of nitrogen from the quantity of exhaust gas as an input, and an insertion conduit structured to feed the quantity of ammonia, generated by the ammonia synthesis catalyst from the quantity of hydrogen generated by the water-gas shift catalyst and the quantity of nitrogen from the quantity of exhaust gas, to a selective catalytic reduction catalyst.

In some embodiments, the exhaust aftertreatment system comprises an oxidation catalyst. A first portion of the quantity of exhaust gas is routed to the ammonia synthesis catalyst to generate the quantity of ammonia and a second portion of the exhaust gas is routed to the oxidation catalyst. The quantity of ammonia is combined with the second portion of the exhaust gas such that a combined exhaust stream is created and fed into the selective catalytic reduction catalyst.

In some embodiments, the selective catalytic reduction catalyst is hydrogen-based. The system further comprises a hydrogen gas conduit configured to capture a quantity of excess hydrogen gas that remains unreacted by the ammonia synthesis catalyst when producing the quantity of ammonia and introduce the quantity of excess hydrogen gas to the selective catalytic reduction catalyst. The quantity of excess hydrogen gas is not greater than 1% in relation to a volume of product generated by the ammonia synthesis catalyst.

In some embodiments, the ammonia synthesis catalyst is configured to operate at a temperature between 100 and 550 degrees Celsius and under atmospheric pressure between 0.5 and 3 atm. The pressure may be progressively increased while the ammonia synthesis catalyst is in operation such that the ammonia synthesis catalyst continues to generate at least the quantity of ammonia using the quantity of hydrogen, generated by the water-gas shift catalyst from the quantity of exhaust gas, and a quantity of nitrogen from the quantity of exhaust gas, as an input. While the ammonia synthesis catalyst is in operation, the temperature of the ammonia synthesis catalyst may be progressively reduced towards 20 degrees Celsius.

In some embodiments, the exhaust aftertreatment system further comprises a computer-readable storage media having computer-executable instructions embodied thereon that, when executed by at least one processor, cause the pressure to be progressively increased or the temperature to be progressively reduced as long as the ammonia synthesis catalyst continues to generate at least the quantity of ammonia per a pre-determined time interval.

BRIEF DESCRIPTION

The details of one or more implementations are set forth in the accompanying drawings and the description below. Other features, aspects, and advantages of the disclosure will become apparent from the description, the drawings, and the claims, in which:

Figure 1:
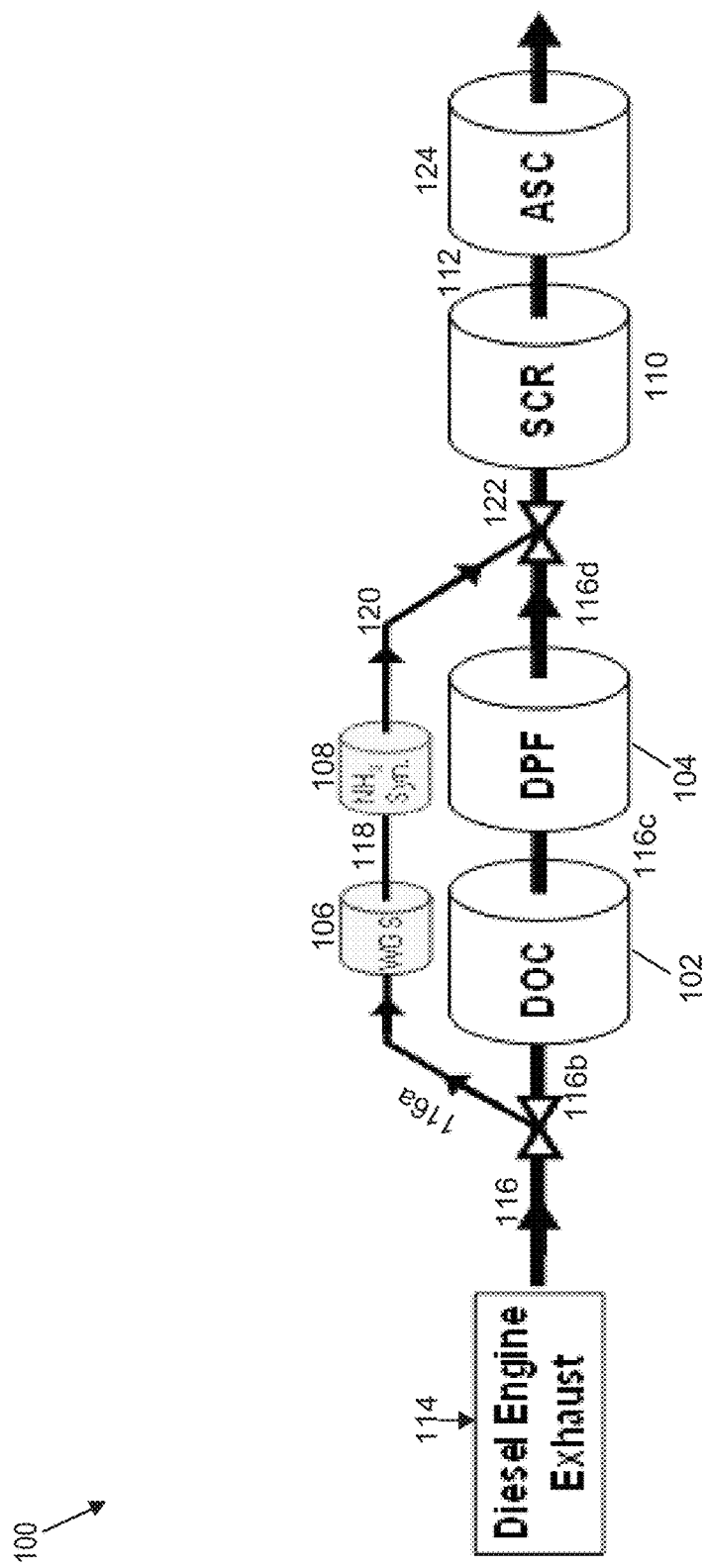
FIG. 1 is a schematic diagram of an example exhaust aftertreatment architecture that utilizes a WGS and ammonia synthesis catalyst for ammonia SCR of $NO_x$, according to an example embodiment.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, assemblies, and systems for, ammonia generation from engine exhaust at ambient conditions using water-gas shift and ammonia synthesis catalysts. Systems and methods for generating ammonia and/or hydrogen from engine exhaust in exhaust aftertreatment systems under ambient conditions comprise at least one water-gas shift (WGS) catalyst and at least one ammonia synthesis catalyst (AMS catalyst) positioned downstream of the WGS catalyst. The WGS catalyst is configured, using the engine exhaust gas as an input, to generate water and hydrogen used by the AMS as inputs to generate ammonia and/or hydrogen. The ammonia and/or hydrogen thus generated are used downstream in ammonia- and/or hydrogen-based selective reduction catalysts (SCR). In some embodiments, very low conversion ratios needed for successful operation (the WGS catalyst $H_2O$ conversion ratio not greater than 25% and the AMS catalyst $N_2$ conversion ratio not greater than 15%) enable the miniaturization of SCR catalysts and/or phasing out of conventional exhaust aftertreatment system components, such as on-board SCR reductant storage and/or dosing. In some embodiments, the ammonia and/or hydrogen are generated under ambient conditions, such as at atmospheric pressure and at room temperature. The various concepts introduced above and discussed in greater detail below may be implemented in any of numerous ways, as the described concepts are not limited to any particular manner of implementation. Examples of specific implementations and applications are provided primarily for illustrative purposes.

In order to reduce emissions, systems and methods are desired to improve the performance of aftertreatment systems. One way to improve performance of aftertreatment systems is to increase the level of ammonia ($NH_3$) fed into a selective catalytic reduction (SCR) system. It is desirable to accomplish the increase in ammonia without additional on-board storage for ammonia and/or ammonia precursors, such as urea. Advantageously, systems and methods described herein and related to ammonia generation from engine exhaust at ambient conditions using water-gas shift and ammonia synthesis catalysts increase the level of ammonia in the engine aftertreatment system.

In some embodiments, the systems and methods presented herein provide an alternative or a secondary option to introducing ammonia to the SCR system via a built-in doser, which reduces manufacturing, operating, and maintenance costs because at least a portion of the ammonia is produced directly from engine exhaust. Ammonia injection from urea-based solutions can be reduced or eliminated. One embodiment comprises a combination of one or more WGS catalysts to produce $H_2$ and one or more ammonia synthesis catalysts to produce ammonia from engine exhaust. Advantageously, in an example embodiment, these processes are carried out at exhaust conditions that are typical for selective catalytic reduction of $NO_x$. In some embodiments, the WGS and/or AMS catalysts are operable at very low conversions: a maximum dose of 25,000 ppm of $NH_3$ is acceptable for diesel engine aftertreatment systems running under extremely high $NH_3$-to-$NO_x$ ratios (0-15). While counterintuitive to the typical use of catalysts to achieve extremely high conversions, this is suitable under engine exhaust conditions, which do not provide the optimal pressure for high ammonia synthesis conversions. Advantageously, ammonia is produced at very low temperatures, in the range of 150-180° C., due to the use of the catalysts at very low conversions which do not require high temperatures. The embodiments of the present disclosure are not limited to the use of any particular catalyst formulation and comprise WGS catalysts and ammonia synthesis catalysts, in various suitable configurations, to ultimately produce ammonia in desirable quantities from engine exhaust. An example implementation, as set forth further herein, is designed to generate ammonia from engine exhaust at ambient conditions using water-gas shift and ammonia synthesis catalysts.

FIG. 1 is a schematic diagram of an example exhaust aftertreatment architecture of an exhaust aftertreatment system 100 that utilizes a WGS and ammonia synthesis catalyst for ammonia SCR of $NO_x$. The exhaust aftertreatment system 100 may be used in heavy-duty applications, such as stationary engines, trucks, and/or buses, and/or in other applications, such as passenger cars and/or light-duty diesel vehicles. As shown, the exhaust aftertreatment system 100 comprises an oxidation catalyst 102, a filter 104, a WGS catalyst 106, an ammonia synthesis catalyst 108, and an SCR catalyst 110. In some embodiments, an ammonia oxidation catalyst (also referred to as an ammonia slip catalyst (ASC)) 124 is positioned downstream of the SCR 110 and is configured to reduce the excess ammonia from the SCR.

The oxidation catalyst 102 is configured to oxidize hydrocarbons and carbon monoxide in the exhaust stream 114, which is received by the oxidation catalyst 102 through the exhaust conduit 116. In some embodiments, the oxidation catalyst 102 is a diesel oxidation catalyst (DOC).

The filter 104 is configured to remove particulate matter, such as soot, from the exhaust stream 114 flowing in the aftertreatment system 100 through the exhaust conduit 116. In some embodiments, the filter 104 is a diesel particulate filter (DPF). The filter 104 comprises an inlet, where the exhaust gas is received, and an outlet, where the exhaust gas exits after having particulate matter substantially filtered from the exhaust gas and/or converting the particulate matter into carbon dioxide.

The WGS catalyst 106 is configured to produce hydrogen ($H_2$) and carbon dioxide ($CO_2$). Advantageously, the WGS catalyst 106 is configured to operate under ambient conditions, as further described in reference to FIG. 2. The WGS catalyst 106 receives a quantity of gas in the exhaust stream 114 from an engine via the exhaust conduit 116. According to various embodiments, the exhaust conduit 116 may comprise a metal, such as aluminized steel, cast iron, chromium, nickel, manganese, copper, and/or titanium, and/or a suitable metal alloy. The surface(s) of the exhaust conduit 116 may comprise a suitable ceramic coating. The quantity of gas in the exhaust stream 114 contains at least a quantity of water and a quantity of carbon monoxide, which are used as inputs into the WGS catalyst 106 and its chemical reactions used to produce the hydrogen and carbon dioxide. In an example embodiment, the WGS catalyst 106 is configured to produce the hydrogen and carbon dioxide according to the chemical reaction $H_2O+CO \rightleftharpoons CO_2+H_2$. In some embodiments, the WGS catalyst 106 comprises copper, chromium, and iron oxide ($Cu/Cr/Fe_2O_3$). In some embodiments, the WGS catalyst 106 comprises copper, zinc, aluminum oxide ($Cu/Zn/Al_2O_3$). In some embodiments, the WGS catalyst 106 comprises cobalt and molybdenum sulfides, such as $CoS_2$ and/or $MoS_2$.

The ammonia synthesis catalyst 108 is configured to produce ammonia at the outlet using at least the hydrogen generated by the WGS catalyst 106. Advantageously, the ammonia synthesis catalyst 108 is configured to operate under ambient conditions, as further described in reference to FIG. 2. In some embodiments, the ammonia synthesis catalyst 108 comprises iron oxide ($Fe_2O_3$). In some embodiments, the ammonia synthesis catalyst 108 comprises cesium, rhenium, and aluminum oxide ($Cs/Re/Al_2O_3$). In some embodiments, the ammonia synthesis catalyst 108 comprises ruthenium and magnesium oxide (Ru/MgO). In some embodiments, the ammonia synthesis catalyst 108 comprises ruthenium nanoparticles on calcium amide (Ru/$Ca(NH_2)_2$).

In an example embodiment, the ammonia synthesis catalyst 108 comprises an inlet configured to receive the hydrogen from the WGS catalyst 106 via the hydrogen gas delivery conduit 118. According to various embodiments, the hydrogen gas delivery conduit 118 may comprise a metal, such as aluminized steel, cast iron, chromium, nickel, manganese, copper, and/or titanium, and/or a suitable metal alloy. The surface(s) of the hydrogen gas delivery conduit 118 may comprise a suitable ceramic coating. In the example embodiment, the ammonia synthesis catalyst 108 comprises an outlet configured to deliver the ammonia generated by the ammonia synthesis catalyst 108 to the SCR 110 through the ammonia delivery conduit 120.

According to various embodiments, the ammonia delivery conduit 120 may comprise a metal, such as aluminized steel, cast iron, chromium, nickel, manganese, copper, and/or titanium, and/or a suitable metal alloy. The surface(s) of the ammonia delivery conduit 120 may comprise a suitable ceramic coating.

In some embodiments, the ammonia synthesis catalyst 108 comprises an electrochemical cell. According to various embodiments, the electrochemical cell may comprise an anode, a cathode, an external load circuit, a voltage source, and an electrolyte, either as a membrane or solution. As inputs, the electrochemical cell receives engine exhaust that contains a quantity of nitrogen gas and a quantity of water or a product gas generated by the water-gas shift catalyst that contains a quantity of hydrogen, a quantity of water, and a quantity of nitrogen.

According to various implementations, the electrochemical cell may be a proton exchange membrane fuel cell (PEMFC) comprising an anode. The anode generates a quantity of protons (H+) and electrons (e−) from a quantity of hydrogen, generated by the water-gas shift catalyst, or from a quantity of water, present in the exhaust generated by the engine. The PEMFG further comprises an electrolyte membrane that transfers a quantity of protons from the anode to the cathode, an external load circuit that transfers the electrons from the anode to the cathode, and a cathode that converts the protons, electrons, and nitrogen gas, which is present in the exhaust generated by the engine, to form ammonia. In instances where the chemical reaction does not occur spontaneously, a voltage is applied to the cell from an external voltage source to induce the reaction. In other implementations, the electrochemical cell may be a galvanic/voltaic cell comprising components similar to the PEMFC but with the anode and cathode each submerged in a separate electrolyte solution and a porous membrane separating the two half cells.

The SCR 110 is configured to assist in the reduction of $NO_x$ emissions by accelerating a $NO_x$ reduction process between the ammonia and the $NO_x$ of the exhaust gas into diatomic nitrogen, water, and/or carbon dioxide. In some embodiments, any excess hydrogen produced in by the ammonia synthesis catalyst 108 is routed to a hydrogen-based SCR (not shown). In some embodiments, the hydrogen-based SCR is configured to convert $NO_x$ to $N_2O$, $N_2$ and $H_2O$ in the presence of $H_2$ and $O_2$. The hydrogen-based SCR may comprise a noble metal-based coating. In the example embodiment, the SCR 110 is an ammonia-based SCR. The SCR 110 comprises an inlet from which exhaust gas and reductant is received and an outlet in fluid communication with an end of the exhaust aftertreatment system 100. In an example embodiment, the SCR 110 receives exhaust gas containing ammonia through the ammonia delivery conduit 120.

In some embodiments, the entire quantity of ammonia used by the SCR 110 is received from the ammonia synthesis catalyst 108. In certain embodiments, the SCR 110 receives and uses an additional amount of ammonia through a reductant dosing system (not shown). An example reductant dosing system comprises a dosing module configured to dose an additional amount of ammonia into a decomposition chamber associated with the SCR 110. The decomposition chamber is configured to convert a reductant, such as urea or diesel exhaust fluid (DEF), into ammonia. The decomposition chamber is in fluid communication with a reductant delivery system having the dosing module configured to dose the reductant into the decomposition chamber. The dosing module is fluidly coupled to one or more reductant sources. A pump may be used to pressurize the reductant from the reductant source for delivery to the dosing module. The reductant is inserted upstream of the SCR 110 and downstream of the oxidation catalyst 102 and/or filter 104. The reductant droplets then undergo the processes of evaporation, thermolysis, and hydrolysis to form gaseous ammonia. The decomposition chamber comprises an inlet in fluid communication with the oxidation catalyst 102 and/or filter 104 to receive the exhaust gas, such as the exhaust stream 114, containing $NO_x$ emissions and an outlet for the exhaust gas, $NO_x$ emissions, ammonia, and/or remaining reductant to flow to the SCR 110.

In some embodiments, the exhaust aftertreatment system 100 is configured to route the entire amount of gas in the exhaust stream 114 through the WGS catalyst 106 and the ammonia synthesis catalyst 108, bypassing the oxidation catalyst 102 and the filter 104. In these implementations, the oxidation catalyst 102 and the filter 104 may be omitted from the aftertreatment system 100. The WGS catalyst 106 receives a quantity of gas in the exhaust stream 114 from an engine via the exhaust conduit 116. The WGS catalyst 106 outputs a quantity of hydrogen, which is delivered by the hydrogen gas delivery conduit 118 to the ammonia synthesis catalyst 108. The ammonia synthesis catalyst 108 outputs a quantity of ammonia, which is delivered by the ammonia delivery conduit 120 to the SCR 110.

In other embodiments, the exhaust aftertreatment system 100 is configured to route only a portion of the entire amount of the exhaust stream 114 through the WGS catalyst 106 and the ammonia synthesis catalyst 108. In such embodiments, the WGS catalyst 106 and the ammonia synthesis catalyst 108 are configured to process the gas in the exhaust stream 114 in parallel with the oxidation catalyst 102 and the filter 104. The exhaust conduit 116 is configured to split into at least two segments to divert a first portion of gas in the exhaust stream 114 to the WGS catalyst 106. According to an example embodiment, the exhaust conduit 116 is split into a first exhaust routing conduit 116a, a second exhaust routing conduit 116b, a third exhaust routing conduit 116c, and a fourth exhaust routing conduit 116d.

The WGS catalyst 106 receives the first portion of the entire amount of gas in the exhaust stream 114 from an engine via the first exhaust routing conduit 116a. The WGS catalyst 106 outputs a quantity of hydrogen, which is routed and delivered by the hydrogen gas delivery conduit 118 to the ammonia synthesis catalyst 108. The ammonia synthesis catalyst 108 outputs a quantity of ammonia, which is routed and delivered by the ammonia delivery conduit 120 to the SCR 110. The oxidation catalyst 102 receives a second portion of the entire amount of gas in the exhaust stream 114 from an engine via the second exhaust routing conduit 116b. The oxidation catalyst 102 is configured to oxidize hydrocarbons and carbon monoxide contained in the second portion of the entire amount of gas in the exhaust stream 114 and to output the product into the exhaust stream 114, which, after flowing through the oxidation catalyst 102, is routed by the third exhaust routing conduit 116c to the filter 104. The filter 104 is configured to remove particulate matter, such as soot, from the exhaust stream 114 and outputs the exhaust stream 114 via the fourth exhaust routing conduit 116d. In some embodiments, the filter 104 is bypassed or omitted such that the third exhaust routing conduit 116c and the fourth exhaust routing conduit 116d are combined and the exhaust stream 114 flows directly to the inlet of the oxidation catalyst 102.

The ammonia produced by the ammonia synthesis catalyst 108 is recombined with the exhaust stream 114 before the combined stream enters the SCR 110 in order to provide ammonia for the SCR 110. The ammonia delivery conduit 120, delivering ammonia from the ammonia synthesis catalyst 108, and the fourth exhaust routing conduit 116d, delivering the exhaust stream 114 processed by the oxidation catalyst 102 and/or the filter 104, are structured to converge such that the combined ammonia and exhaust stream 114 are delivered in a single stream by the exhaust gas recombination conduit 122. According to various embodiments, the exhaust gas recombination conduit 122 may comprise a metal, such as aluminized steel, cast iron, chromium, nickel, manganese, copper, and/or titanium, and/or a suitable metal alloy. The surface(s) of the exhaust gas recombination conduit 122 may comprise a suitable ceramic coating.

Some embodiments comprise a controller (not shown). In some embodiments, the controller comprises a microprocessor, an application-specific integrated circuit (ASIC), a field-programmable gate array (FPGA), etc., or combinations thereof. The controller may comprise memory which may comprise, but is not limited to, electronic, optical, magnetic, or any other storage or transmission device capable of providing a processor, ASIC, FPGA, etc. with program instructions. The memory may comprise a memory chip, Electrically Erasable Programmable Read-Only Memory (EEPROM), erasable programmable read only memory (EPROM), flash memory, or any other suitable memory from which the controller can read instructions. The instructions may comprise code from any suitable programming language.

Some embodiments further comprise at least one sensor electronically coupled with the controller and configured to provide values and/or signals pertaining to operation of the components of the aftertreatment system 100. For example, a sensor may be positioned upstream of the WGS catalyst 106 and/or oxidation catalyst 102 and is configured to measure the amount, velocity, composition (such as the components described in relation to FIG. 2), throughput, and/or other characteristics associated with the exhaust stream 114. The values and/or signals provided by the sensor are used by the controller configured to determine the quantity of gas in the first portion of the exhaust stream 114 to route to the WGS catalyst 106 and/or the quantity of gas in the second portion of the exhaust stream to route to the oxidation catalyst 102. In some embodiments, the values and/or signals provided by the sensor are used by the controller configured to set and/or adjust the parameters for operation of the WGS catalyst 106, such as its operating temperature, timing of operation and/or pressure.

A sensor positioned downstream of the WGS catalyst 106 may be configured to determine the composition of the output stream of the WGS catalyst 106. The values and/or signals provided by the sensor are used by the controller configured to set and/or adjust the parameters for operation of the ammonia synthesis catalyst 108, such as its operating temperature, timing of operation and/or pressure.

In some embodiments, a sensor is positioned downstream of the ammonia synthesis catalyst 108 and is configured to determine the composition of the output stream of the ammonia synthesis catalyst 108. The sensor may be configured to determine the quantity of the excess hydrogen produced by the ammonia synthesis catalyst 108 for routing to the hydrogen-based SCR. The values and/or signals provided by the sensor are used by the controller configured to determine the timing and/or quantity of the excess hydrogen for routing to the hydrogen-based SCR. The values and/or signals provided by the sensor are used by the controller to set and/or adjust the parameters for operation of the SCR 110, such as the timing of actuation of the dosing module to deliver additional ammonia. The dosing module and the pump may be electrically or communicatively coupled to the controller and configured to control the dosing module to dose the reductant to produce additional ammonia for insertion in the decomposition chamber associated with the SCR catalyst 110.

Figure 2:
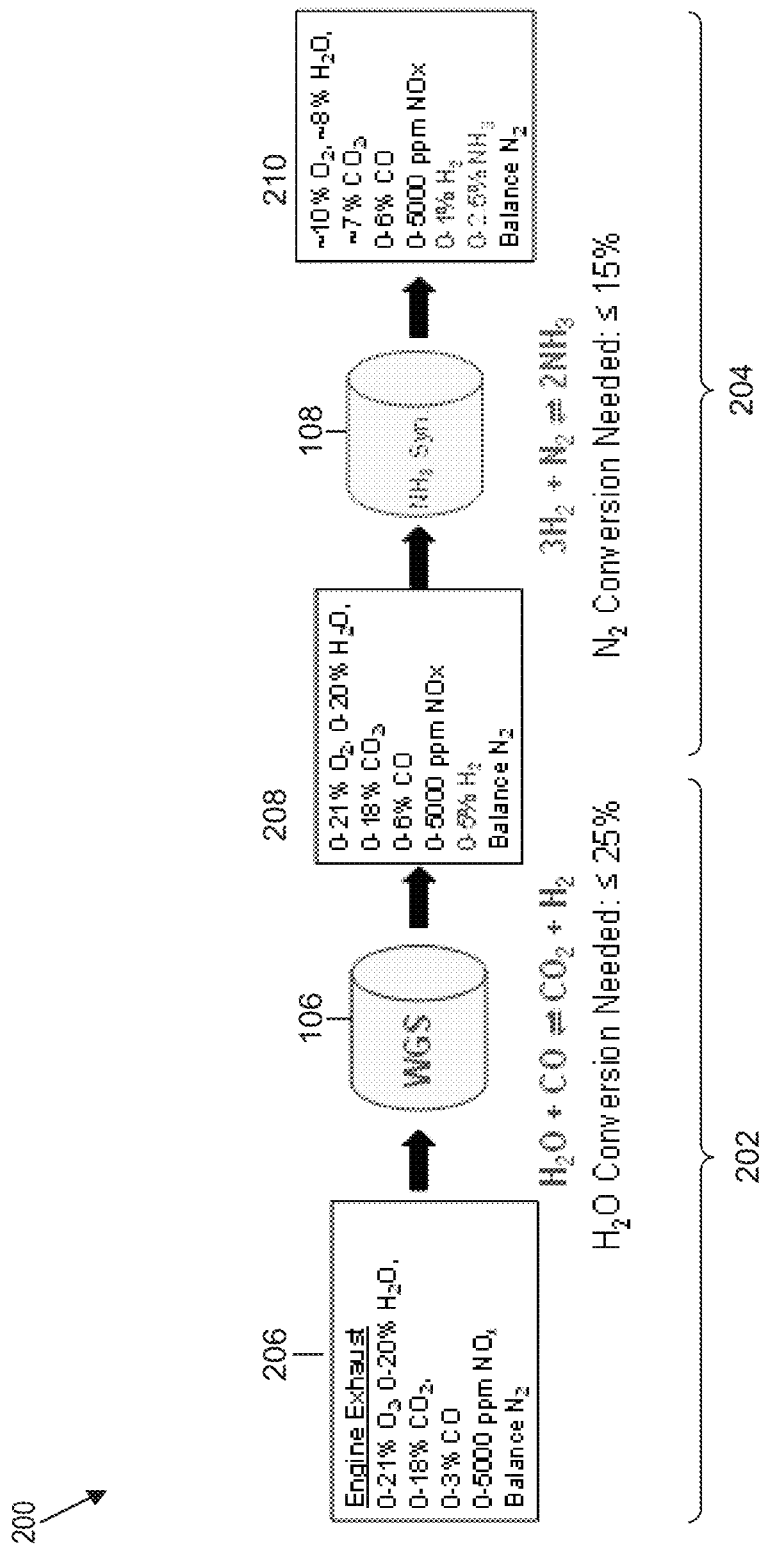
FIG. 2 is a flow diagram of gas species across WGS and ammonia synthesis catalysts, such as those of the system of FIG. 1, using typical diesel engine exhaust as the feed, according to an example embodiment.

FIG. 2 is a flow diagram 200 of gas species across WGS and ammonia synthesis catalysts, such as those of the system of FIG. 1, using typical diesel engine exhaust as the feed, according to an example embodiment. The flow diagram 200 in FIG. 2 provides an example of the gas species across the catalysts in this process along with required conversions to produce 25,000 ppm $NH_3$ at the outlet.

The flow diagram 200 includes the WGS catalyst 106 of FIG. 1 and the ammonia synthesis catalyst 108 of FIG. 1. The WGS catalyst 106 is configured to receive an input stream 206 and to produce an intermediary product stream 208. The input stream 206 comprises the exhaust stream 114. In the example embodiment, the composition of the input stream 206 comprises 0-21% $O_2$, 0-20% $H_2O$, 0-18% $CO_2$, 0-3% CO, 0-5000 ppm $NO_x$, and/or $N_2$. A WGS reaction carried out in the example embodiment by the WGS catalyst 106 is in the form $H_2O+CO \rightleftharpoons CO_2+H_2$. The quantity of nitrogen gas from the quantity of exhaust gas flows through the water-gas shift catalyst and may not participate in the chemical reaction of the water-gas shift catalyst.

Advantageously, the WGS reaction carried out by the WGS catalyst 106 is performed under a high $H_2O/CO$ ratio (1-700). Diesel engine exhaust contains approximately 8% $H_2O$, 7% $CO_2$, and 300-500 ppm of CO, all of the gas species needed to produce hydrogen with a very high $H_2O/CO$ ratio. Advantageously, WGS catalysts only need to achieve 25% conversion of $H_2O$ to produce the maximum amount of NH3 needed in the example embodiment of FIG. 1. An HTS catalyst, which is typically operated at 300-450° C., is active with very low conversions down to 200° C. Thus, LTS catalysts, which are typically operated at 180-275° C., are configurable to produce $H_2$ at very low $H_2O$ conversions at temperatures reduced to at least 150° C.

The ammonia synthesis catalyst 108 is configured to receive the intermediary product stream 208 and to produce an output stream 210. In the example embodiment, the intermediary product stream 208 comprises 0-21% $O_2$, 0-20% $H_2O$, 0-18% $CO_2$, 0-6% CO, 0-5000 ppm $NO_x$, 0-5% $H_2$, and/or $N_2$. The ammonia synthesis reaction carried out in the example embodiment by the ammonia synthesis catalyst 108 is in the form $3H_2+N_2 \rightleftharpoons 2NH_3$. In the example embodiment, the output stream 210 comprises 10% $O_2$, 8% $H_2O$, 7% $CO_2$, 0-6% CO, 0-5000 ppm $NO_x$, 0-1% $H_2$, 0-2.5% $NH_3$, and/or $N_2$.

Referring further to the ammonia synthesis catalyst 108, diesel engine exhaust, such as gas in the exhaust stream 114 of FIG. 1, contains 75% $N_2$ at atmospheric pressure and temperatures up to 550° C. or greater, which is a good source of $N_2$ for ammonia synthesis. Despite the high pressure typically required by the industrial process to achieve high conversions, the ammonia synthesis catalyst 108 of the example embodiment is configured to perform this reaction at around atmospheric pressure (0.5 to 3 atm). One of the contributing factors in this configuration is the composition of the ammonia synthesis catalyst 108, which, according to example embodiments, comprises cesium, rhenium, and aluminum oxide ($Cs/Re/Al_2O_3$); ruthenium and magnesium oxide (Ru/MgO); ruthenium nanoparticles on calcium amide ($Ru/Ca(NH_2)_2$); and/or an electrochemical cell. These configurations produce low conversion ratios but the inventor has determined that, advantageously, ammonia synthesis catalysts only need to achieve ≤15% conversion of $N_2$ to produce the maximum amount of $NH_3$ needed, for example, in the example embodiment of FIG. 1. Ammonia synthesis catalysts conventionally have demonstrated catalytic activity at temperatures as low as 200° C. and at atmospheric pressure. According to an example embodiment, at pressure points higher than the atmospheric pressure, the ammonia synthesis catalyst 108 remains active at temperatures as low as 20° C. (room temperature). Thus, low $N_2$ conversions of 15% or less are sufficient in the example embodiments of FIG. 2 and are achieved at atmospheric pressure. Advantageously, while typically oxygen poisoning of the ammonia synthesis catalyst is a concern, the low conversion requirement reduces this risk-for example, because a ruthenium-based ammonia synthesis catalyst 108 of the example embodiment is configurable for use in both ammonia synthesis and passive ammonia SCR applications. Furthermore, according to some embodiments, ammonia synthesis is achieved directly from air (oxygen and nitrogen) and water of the input stream at the ambient temperature of 20-40° C. and pressure of 0.5-1.5 atm using electrochemical methods, such as a PEMFC. In some embodiments, ammonia synthesis is achieved from a stream of hydrogen and nitrogen at the temperature range of 200-340° C. and pressure range of 1-10 atm using solid metal or metal oxide catalysts, such as ruthenium nanoparticles on calcium amide ($Ru/Ca(NH_2)_2$).

Figure 3:
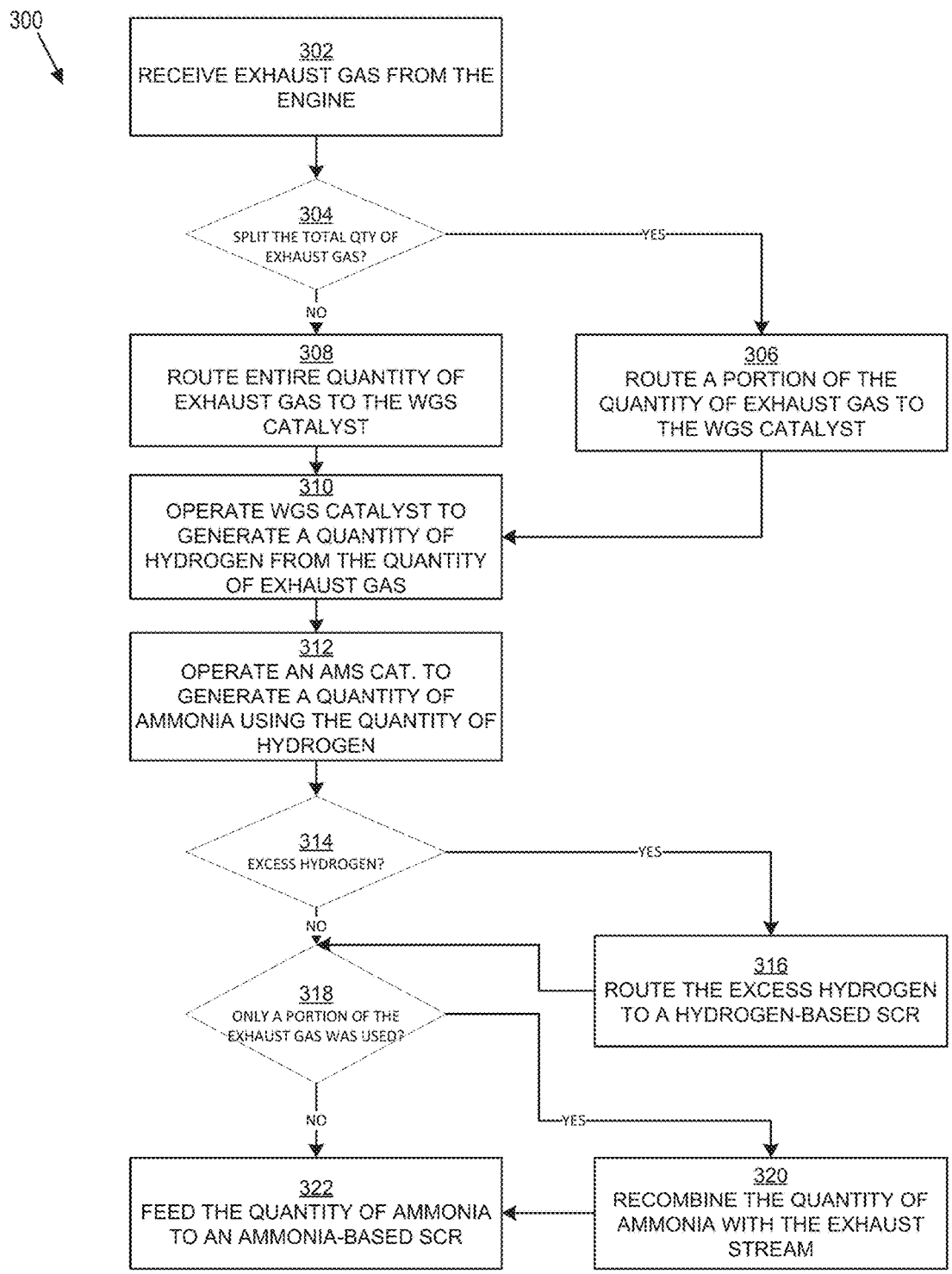
FIG. 3 is a diagram of a method for generating ammonia from engine exhaust, according to an example embodiment.

FIG. 3 is a diagram of a method 300 for generating ammonia from engine exhaust according to an example embodiment. At 302, a quantity of exhaust gas is received from the engine-for example, in the exhaust stream 114 of FIG. 1. The quantity of exhaust gas contains a quantity of water ($H_2O$) and a quantity of carbon monoxide (CO). The quantity of water in relation to the quantity of exhaust gas is 20% or less. The quantity of carbon monoxide in relation to the quantity of exhaust gas is 3% or less.

At 304, a determination is made whether the total quantity of the exhaust gas received from the engine should be split. In some embodiments, this determination is made by the controller based on input by at least one sensor as described in reference to FIG. 1. The controller may set a digital flag to indicate that the total quantity of the exhaust gas had been split. In other embodiments, this determination is built into the functionality of the conduits, described in reference to FIG. 1, such that, for example, the first portion of gas in the exhaust stream 114 is automatically routed via the first exhaust routing conduit 116a and the second portion of gas in the exhaust stream 114 is automatically routed via the second routing conduit 116b when the exhaust stream 114 reaches the point where the exhaust conduit 116 splits into the first exhaust routing conduit 116a and the second exhaust routing conduit 116b.

If the total quantity of gas in the exhaust stream 114 is split, then, at 306, only a portion of the quantity of the exhaust gas received from the engine at 302 is routed to the WGS catalyst 106 of FIG. 1. Otherwise, the entire total quantity of the exhaust gas in the exhaust stream 114 received from the engine is routed to the WGS catalyst 106 at 308. The WGS catalyst 106 is configured to generate a quantity of hydrogen from the exhaust gas received as an input as described, for example, in reference to FIG. 2.

At 310, the WGS catalyst 106 is operated to generate a quantity of hydrogen from the quantity of exhaust gas as described, for example, in reference to FIG. 2. The quantity of the entire exhaust gas is the entire total quantity of the exhaust gas received from the engine in the exhaust stream 114, routed to the WGS catalyst 106 at 308, or a portion of the quantity of the exhaust gas received from the engine in the exhaust stream 114, routed to the WGS catalyst 106 at 306.

At 312, an ammonia synthesis catalyst, such as the ammonia synthesis catalyst 108 of FIG. 1, is operated to generate a quantity of ammonia using the quantity of hydrogen generated by the WGS catalyst 106 at 310 as described, for example, in reference to FIG. 2.

In some embodiments including a hydrogen-based SCR, at 314, a determination is made whether the ammonia synthesis catalyst 108 generated an excess quantity of hydrogen. This determination may be made by the controller based on input by at least one sensor as described in reference to FIG. 1. If a determination is made that excess hydrogen is available, at 316, the excess hydrogen is routed to the hydrogen-based SCR, where a $NO_x$ reduction process takes place. This determination may be made by the controller and may include a calculation of the excess hydrogen amount. At 318, a determination is made whether the total quantity of gas in the exhaust stream had been split. This determination may be made based on the physical structure of the conduit(s) and/or based on whether a flag had been digitally set by the controller at 304. In some embodiments, this determination is made based at least on input(s) from one or more sensors configured to capture the amount of ammonia generated by the ammonia synthesis catalyst 108 in relation to the quantity of gas from exhaust stream 114. If the answer at 318 is yes, then, at 320, the quantity of ammonia generated by the ammonia synthesis catalyst 108 at 312 is recombined (for example, as described in reference to FIG. 1) with the quantity of gas from exhaust stream 114 processed through the oxidation catalyst 102 and/or the filter 104.

At 322, the quantity of ammonia generated by the ammonia synthesis catalyst 108 is fed into an SCR, such as the SCR 110 of FIG. 1.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desired results. In certain circumstances, the separation of various system components in the implementations described above should not be understood as requiring such separation in all implementations, and it should be understood that the described components and systems can generally be integrated in a single product or packaged into multiple products embodied on tangible media.

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can comprise special purpose logic circuitry, e.g., an FPGA or an ASIC. The apparatus can also comprise, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

As utilized herein, the terms "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The term "coupled" and the like as used herein means the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may comprise piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can comprise a portion and/or the entire item unless specifically stated to the contrary.

What is claimed is:

1. A method for treating exhaust gas in an aftertreatment system, the method comprising:
   receiving a quantity of exhaust gas from an engine, the quantity of exhaust gas containing a quantity of water, a quantity of nitrogen, and a quantity of carbon monoxide;
   generating a quantity of hydrogen from the quantity of water and the quantity of carbon monoxide using a water-gas shift catalyst;
   generating, using an ammonia synthesis catalyst, a quantity of ammonia using the quantity of hydrogen generated by the water-gas shift catalyst from the quantity of exhaust gas and the quantity of nitrogen from the quantity of exhaust gas, as an input; and
   feeding, by an insertion conduit, the quantity of ammonia, generated by the ammonia synthesis catalyst from the quantity of hydrogen generated by the water-gas shift catalyst, and the quantity of nitrogen from the quantity of exhaust gas to a selective catalytic reduction catalyst,
   wherein a water conversion ratio of the water-gas shift catalyst is not greater than 25%.

2. The method of claim 1, wherein the quantity of nitrogen gas from the quantity of exhaust gas flows through the water-gas shift catalyst, and wherein the method further comprises feeding the quantity of nitrogen gas to the ammonia synthesis catalyst and generating at least the quantity of ammonia at a nitrogen gas conversion ratio of not greater than 15%.

3. The method of claim 1, wherein the quantity of exhaust gas received from the engine is a portion of a total quantity of exhaust gas generated by the engine over a time period, and wherein the method further comprises:
   routing the quantity of exhaust gas, by the exhaust conduit, to the water-gas shift catalyst to generate the quantity of hydrogen gas; and
   introducing, by an exhaust re-combination conduit, the quantity of ammonia to the selective catalytic reduction catalyst by combining the quantity of ammonia with the total quantity of exhaust gas generated by the engine.

4. The method of claim 1, wherein the selective catalytic reduction catalyst is hydrogen-based, and wherein the method further comprises:
   capturing, by a hydrogen gas conduit, a quantity of excess hydrogen gas that remains unreacted by the ammonia synthesis catalyst when producing the quantity of ammonia; and
   introducing, by the hydrogen gas conduit, the quantity of excess hydrogen gas to the selective catalytic reduction catalyst,
   wherein the quantity of excess hydrogen gas is not greater than 1% in relation to a volume of product generated by the ammonia synthesis catalyst.

5. The method of claim 1, wherein the quantity of ammonia generated by the ammonia synthesis catalyst from the quantity of hydrogen generated by the water-gas shift catalyst is not greater than 2.5% in relation to a volume of product generated by the ammonia synthesis catalyst.

6. The method of claim 1, wherein the quantity of hydrogen generated by the water-gas shift catalyst is not greater than 5% in relation to a volume of product generated by the water-gas shift catalyst.

7. The method of claim 1, wherein the quantity of water in relation to the quantity of exhaust gas is not greater than 20%.

8. The method of claim 1, wherein the quantity of carbon monoxide in relation to the quantity of exhaust gas is not greater than 3%.

9. The method of claim 1, wherein the water-gas shift catalyst is a high temperature-shift catalyst, the method further comprising operating the water-gas shift catalyst at a temperature between 200 to 550 degrees Celsius.

10. The method of claim 1, wherein the water-gas shift catalyst is a low temperature-shift catalyst, the method further comprising operating the water-gas shift catalyst at a temperature between 100 to 300 degrees Celsius.

11. The method of claim 1, further comprising operating the ammonia synthesis catalyst at a temperature between 100 and 550 degrees Celsius and under atmospheric pressure between 0.5 and 3 atm.

12. The method of claim 1, further comprising:
   initially operating the ammonia synthesis catalyst at a temperature between 100 and 550 degrees Celsius and under atmospheric pressure between 0.5 and 3 atm; and progressively increasing the pressure while the ammonia synthesis catalyst is in operation such that the ammonia synthesis catalyst continues to generate at least the quantity of ammonia using the quantity of hydrogen, generated by the water-gas shift catalyst from the quantity of exhaust gas, and a quantity of nitrogen from the quantity of exhaust gas, as an input.

13. The method of claim 12, further comprising progressively reducing the temperature of the ammonia synthesis catalyst towards 20 degrees Celsius.

14. An exhaust aftertreatment system comprising:
an exhaust conduit structured to receive a quantity of exhaust gas from an engine, the quantity of exhaust gas containing a quantity of water, a quantity of nitrogen, and a quantity of carbon monoxide;
a water-gas shift catalyst structured to generate at least a quantity of hydrogen from the quantity of water and the quantity of carbon monoxide, a water conversion ratio of the water-gas shift catalyst being not greater than 25%;
an ammonia synthesis catalyst structured to generate at least a quantity of ammonia using the quantity of hydrogen generated by the water-gas shift catalyst and the quantity of nitrogen from the quantity of exhaust gas as an input; and
an insertion conduit structured to feed the quantity of ammonia, generated by the ammonia synthesis catalyst from the quantity of hydrogen generated by the water-gas shift catalyst and the quantity of nitrogen from the quantity of exhaust gas, to a selective catalytic reduction catalyst.

15. The exhaust aftertreatment system of claim 14, further comprising an oxidation catalyst, wherein a first portion of the quantity of exhaust gas is routed to the ammonia synthesis catalyst to generate the quantity of ammonia and a second portion of the exhaust gas is routed to the oxidation catalyst, and wherein the quantity of ammonia is combined with the second portion of the exhaust gas such that a combined exhaust stream is created and fed into the selective catalytic reduction catalyst.

16. The exhaust aftertreatment system of claim 14, wherein the selective catalytic reduction catalyst is hydrogen-based, the system further comprising a hydrogen gas conduit configured to:
capture a quantity of excess hydrogen gas that remains unreacted by the ammonia synthesis catalyst when producing the quantity of ammonia; and
introduce the quantity of excess hydrogen gas to the selective catalytic reduction catalyst; wherein the quantity of excess hydrogen gas is not greater than 1% in relation to a volume of product generated by the ammonia synthesis catalyst.

17. The exhaust aftertreatment system of claim 14, wherein the ammonia synthesis catalyst is configured to operate at a temperature between 100 and 550 degrees Celsius and under atmospheric pressure between 0.5 and 3 atm.

18. The exhaust aftertreatment system of claim 17, wherein, while the ammonia synthesis catalyst is in operation, the temperature of the ammonia synthesis catalyst is progressively reduced towards 20 degrees Celsius.

19. The exhaust aftertreatment system of claim 18, further comprising a computer-readable storage media having computer-executable instructions embodied thereon that, when executed by at least one processor, cause the pressure to be progressively increased and the temperature to be progressively reduced as long as the ammonia synthesis catalyst continues to generate at least the quantity of ammonia per a pre-determined time interval.

20. The exhaust aftertreatment system of claim 14, wherein the pressure is progressively increased while the ammonia synthesis catalyst is in operation such that the ammonia synthesis catalyst continues to generate at least the quantity of ammonia using the quantity of hydrogen, generated by the water-gas shift catalyst from the quantity of exhaust gas, and a quantity of nitrogen from the quantity of exhaust gas, as an input.

* * * * *